United States Patent
Yang et al.

(10) Patent No.: US 10,112,184 B2
(45) Date of Patent: Oct. 30, 2018

(54) ALUMINOSILICATE AEI ZEOLITE PREPARATION

(71) Applicant: Johnson Matthey Public Limited Company, London (GB)

(72) Inventors: Sanyuan Yang, Savannah, GA (US); David Lang, Savannah, GA (US)

(73) Assignee: Johnson Matthey Public Limited Company, London (GB)

( * ) Notice: Subject to any disclaimer, the term of this patent is extended or adjusted under 35 U.S.C. 154(b) by 43 days.

(21) Appl. No.: 15/349,103

(22) Filed: Nov. 11, 2016

(65) Prior Publication Data

US 2017/0128921 A1    May 11, 2017

Related U.S. Application Data

(60) Provisional application No. 62/253,939, filed on Nov. 11, 2015, provisional application No. 62/320,667, filed on Apr. 11, 2016.

(51) Int. Cl.
| | | |
|---|---|---|
| *C01B 39/48* | (2006.01) | |
| *B01J 29/70* | (2006.01) | |
| *B01J 37/00* | (2006.01) | |

(52) U.S. Cl.
CPC ........... *B01J 29/70* (2013.01); *B01J 37/0018* (2013.01); *C01B 39/48* (2013.01)

(58) Field of Classification Search
CPC .......... C04B 39/02; C04B 39/48; B01J 29/70; B01J 37/0018
See application file for complete search history.

(56) References Cited

U.S. PATENT DOCUMENTS

| | | | |
|---|---|---|---|
| 5,958,370 A | 9/1999 | Zones et al. | |
| 7,622,417 B2 * | 11/2009 | Mertens | B01J 29/83 423/111 |
| 2016/0122192 A1 * | 5/2016 | Dusselier | C07C 67/37 423/703 |
| 2016/0243531 A1 | 8/2016 | Dusselier et al. | |

FOREIGN PATENT DOCUMENTS

| | | |
|---|---|---|
| GB | 2521909 A | 7/2015 |
| WO | 2014141200 A1 | 9/2014 |
| WO | 2015063501 A1 | 5/2015 |
| WO | 2016166245 A1 | 10/2016 |

OTHER PUBLICATIONS

Martin et al.; Efficient synthesis of the Cu-SSZ-39 catalyst for DeNOx applications;Chem. Commun. 2015. 51. 11030; The Royal Society of Chemistry 2015.

* cited by examiner

*Primary Examiner* — David M Brunsman
(74) *Attorney, Agent, or Firm* — Gary D. Mangels

(57) ABSTRACT

A method for synthesizing AEI zeolites is provided which results in high relative yields of AEI based on the weight of the reaction mixture and on the structure directing agent. The method also provides for the reduced use of water in the reaction mixture. A reaction mixture composition comprises the following components: at least one source of silica, at least one source of alumina, at least one structure directing agent (SDA), a source of hydroxide ions and water, where the silica sources and the alumina sources are expressed as SiO2 and Al2O3, respectively, and the components are present in the following ratios:

| | |
|---|---|
| $SiO_2/Al_2O_3$ | 10-100 |
| $OH^-/SiO_2$ | 0.2-0.9 |
| $SDA/SiO_2$ | 0.01-0.20 |
| Alkali metal cation/$SiO_2$ | 0.20-1.0 |
| $H_2O/SiO_2$ | 4-60. |

9 Claims, No Drawings

ALUMINOSILICATE AEI ZEOLITE PREPARATION

FIELD OF INVENTION

The present invention relates to a method of preparation of a molecular sieve having an AEI framework. The invention also relates to a unique molecular sieve produced by the method, as well as the molecular sieve's use as a catalyst.

BACKGROUND

Zeolites are crystalline or quasi-crystalline aluminosilicates constructed of repeating $TO_4$ tetrahedral units with T being most commonly Si, Al or P (or combinations of tetrahedral units). These units are linked together to form frameworks having regular cavities and/or channels of molecular dimensions within the crystal. Numerous types of synthetic zeolites have been synthesized and each has a unique framework based on the specific arrangement its tetrahedral units. By convention, each topological type is assigned a unique three-letter code (e.g., "AEI") by the International Zeolite Association (IZA).

Zeolites have numerous industrial applications, and zeolites of certain frameworks, such as AEI, are known to be effective catalyst for treating combustion exhaust gas in industrial applications including internal combustion engines, gas turbines, coal-fired power plants, and the like. In one example, nitrogen oxides ($NO_x$) in the exhaust gas may be controlled through a so-called selective catalytic reduction (SCR) process whereby $NO_x$ compounds in the exhaust gas are contacted with a reducing agent in the presence of a zeolite catalyst. Other industrial applications include the use of zeolites for methanol-to-olefin (MTO) applications.

Synthetic zeolites of the AEI topological type when prepared as aluminosilicate compositions are produced using structure directing agents (SDAs), also referred to as a "templates" or "templating agents". The SDAs that are used in the preparation of aluminosilicate AEI topological type materials are typically complex organic molecules which guide or direct the molecular shape and pattern of the zeolite's framework. Generally, the SDA can be considered as a mold around which the zeolite crystals form. After the crystals are formed, the SDA is removed from the interior structure of the crystals, leaving a molecularly porous aluminosilicate cage.

In typical synthesis techniques, solid zeolite crystals are formed from a reaction mixture which contains the framework reactants (e.g., a source of silica and a source of alumina), a source of hydroxide ions (e.g., NaOH), and an SDA. Such synthesis techniques usually take several days (depending on factors such as crystallization temperature) to achieve the desired crystallization. When crystallization is complete, the solid product containing the zeolite crystals is separated from the mother liquor which is discarded. This discarded mother liquor contains unused SDA, which is often degraded due to harsh reaction conditions, and unreacted silica.

Known SDAs for use in AEI zeolite synthesis are relatively expensive and contribute to a substantial portion of the cost of manufacturing the zeolite. In addition, conventional methods for synthesizing zeolite AEI have a relatively poor yield based on the SDA (a key component of the reaction mixture) which also impacts manufacturing costs.

U.S. Pat. No. 5,958,370 describes conditions for the synthesis of SSZ-39, also known as AEI. Sodium silicate was used as the source of silica, while one of the following zeolites was used as an alumina source: $NH_4Y$ (SAR~5.2), NaY (SAR~5.2), dealuminated USY (SAR~13). Sodium hydroxide and sodium silicate were used as bases while various templates were used (see Table 1.2). Table A of U.S. Pat. No. 5,958,370 shows the typical and preferred ratios of the components in the reaction mixture.

TABLE A

| | Reaction Mixture | |
|---|---|---|
| Generic | Typical | Preferred |
| $YO_2/W_aO_b$ | 10-100 | 15-60 |
| $OH$—$/YO_2$ | 0.5-1.0 | 0.6-0.8 |
| $Q/YO_2$ | 0.05-0.50 | 0.10-0.20 |
| $M_2/n/YO_2$ | 0.30-1.0 | 0.50-0.60 |
| $H_2O/YO_2$ | 20-80 | 30-40 |

Y, W, Q, M and n are defined. When Y is silicon; W is aluminum, Q is a SDA, M is a sodium cation and n=1. The examples used extremely small batch sizes, with one example producing 2.1 g of product and the others producing less than 0.5 g of product.

Moliner, et al. (Chem. Commun., 48 (2012) 8264) described the synthesis of Cu-exchanged SSZ-39 using sodium silicate or LUDOX as a silicon source, USY_CBV500, aluminum hydroxide or alumina, as the aluminum source and N—N-dimethyl-3,5-dimethylpiperidinium cation (Template H in U.S. Pat. No. 5,958,370) as the SDA. Of the twelve different reaction conditions tried, only three resulted in the formation of AEI after crystallization at 135° C. for 7 days under static conditions. Information on the size of the reaction mixture used was not provided. Only the use of $NH_4Y$, but not alumina or aluminum hydroxide, as the alumina source resulted in the formation of AEI. Only the use of sodium silicate, but not silica sol, as the silica source resulted in the formation of AEI. More dilute reaction mixture favored the formation of AEI.

Accordingly, it would be desirable to reduce the cost of the synthesis process, preferably by a means that has a low impact on the environment. This invention satisfies this need amongst others.

SUMMARY

Applicants have discovered a process for increasing the yield of AEI relative to the weight of the reaction mixture ("AEI yield") and increasing the relative yield based on the SDA in an AEI zeolite synthesis process. As used herein, the term "relative yield" with respect to the SDA means the amount of SDA that is directly used in constructing the zeolite framework across one or more sequential batches (vis-à-vis the amount of SDA remaining in mother liquor) relative to the amount of SDA introduced into the process as a whole. Applicants have also discovered that the process reduces the amount of water needed in the reaction mixture.

Surprisingly, and in contrast to all previous reports on the synthesis of zeolites with the AEI topological type with an aluminosilicate composition, applicants have now developed a "once through" preparation procedure (i.e. not involving mother liquor recycle) that has a high relative yield of SDA. Accordingly, by means of the once through process that is the subject of the present invention, an AEI topological type zeolite with an aluminosilicate composition can be formed with: (1) a relative yield based on the weight of AEI obtained per weight of reaction mixture of ≥about 6 percent, (2) a relative yield on structure directing agent of ≥about 30 percent or (3) a relative yield based on the weight of AEI obtained per weight of reaction mixture of ≥about 6 percent and a relative yield on structure directing agent of ≥about 30 percent.

Provided is a method for achieving a high AEI yield in an AEI topological type zeolite with an aluminosilicate composition employing a synthesis process comprising the steps of (a) preparing an admixture comprising (i) at least one source of aluminum, (ii) at least one source of silica, (iii) at least one source of hydroxide ions, and (iv) an AEI structured directing agent (SDA); and (b) reacting the admixture under crystallization conditions to form zeolite crystals having an AEI framework. The crystals having an AEI framework can have a silica-to-alumina ratio (SAR) of between about 8 to about 50, inclusive, preferably between about 10 to about 30, inclusive, more preferably between about 11 and about 26, inclusive. The method can provide: (1) a relative yield based on SDA of ≥about 30 percent, (2) a relative AEI yield based on the weight of the reaction mixture of ≥5.9% or (3) a relative yield based on SDA of ≥about 30 percent and a relative AEI yield based on the weight of the reaction mixture of ≥5.9%. The method provides for a reduction of about 50% in the amount of water needed in the reaction mixture which is partially responsible for an increase in the relative AEI yield based on the weight of the reaction mixture.

Also provided is a composition comprises the following components: at least one source of silica, at least one source of alumina, at least one structure directing agent (SDA), a source of hydroxide ions and water, where the silica sources and the alumina sources are expressed as $SiO_2$ and $Al_2O_3$, respectively, and the components are present in the following ratios:

| | |
|---|---|
| $SiO_2/Al_2O_3$ | 10-100 |
| $OH^-/SiO_2$ | 0.2-0.9 |
| $SDA/SiO_2$ | 0.01-0.20 |
| Alkali metal cation/$SiO_2$ | 0.20-1.0 |
| $H_2O/SiO_2$ | 4-60. |

This composition, upon reacting at an elevated temperature, produces AEI.

DETAILED DESCRIPTION

In one aspect, the present invention is an improved method for synthesizing AEI topological type zeolites with an aluminosilicate composition. Preferably, the invention involves the use of certain reactants and/or ratios of these reactants to improve the relative yield on SDA compared to the use of conventional reactants.

The relative yield can be improved by the selection of SDAs that can form, or direct the formation of, the AEI topological type with an aluminosilicate composition with a minimum of excess, that is, the SDA has a high structure directing effect.

The method can comprise the sequential steps of (a) forming an AEI topological type zeolite reaction admixture and (b) reacting the admixture under crystallization conditions to form a batch of zeolite crystals having an x-ray diffraction pattern consistent with the AEI topological type. The precipitated zeolite crystals are preferably separated from the subsequent mother liquor by any conventional technique, such as filtration.

As used herein, the term "AEI" refers to an AEI topological type as recognized by the International Zeolite Association (IZA) Structure Commission and the term "AEI zeolite" means an aluminosilicate in which the primary crystalline phase is AEI. Other crystalline phases such as FAU topological type and/or MFI topological type and/or MOR topological type can also be present, but the primary crystalline phase comprises ≥about 90 weight percent AEI, preferably ≥about 95 weight percent AEI, and even more preferably ≥about 97 or ≥about 99 weight percent AEI. The molecular sieve may contain FAU topological type and/or MFI topological type and/or MOR topological type in minor amounts, preferably less than, an aggregate total, of 5 weight percent, and even more preferably less than about 3 weight percent, or even less than about 1 weight percent. Preferably, the AEI molecular sieve is substantially free of other crystalline phases and is not an intergrowth of two or more framework types. By "substantially free" with respect to other crystalline phases, it is meant that the molecular sieve contains ≥99 weight percent AEI.

As used herein the term "zeolite" means a synthetic aluminosilicate molecular sieve having a framework constructed of alumina and silica (i.e., repeating $SiO_4$ and $AlO_4$ tetrahedral units), and preferably having a silica-to-alumina ratio (SAR) of ≥8, preferably between about 8 to about 50, inclusive, more between about 10 to about 30, inclusive, most preferably between about 11 and about 26, inclusive.

The zeolites of the present invention are not silicoaluminophosphates (SAPOs) and thus do not have an appreciable amount of phosphorous in their framework. That is, the zeolite frameworks do not have phosphorous as a regular repeating unit and/or do not have an amount of phosphorous that would affect the basic physical and/or chemical properties of the material, particularly with respect to the material's capacity to selectively reduce $NO_x$ over a broad temperature range or to be used methanol-to-olefins (MTO) applications. The amount of framework phosphorous can be less than about 1 weight percent, preferably less than 0.1 weight percent, most preferably less than 0.01 weight percent, based on the total weight of the zeolite.

Zeolites synthesized by the present method may include one or more non-framework alkali and/or alkaline earth metals. These metals are typically introduced into the reaction mixture in conjunction with the source of hydroxide ions. Examples of such metals include sodium and/or potassium, and also magnesium, calcium, strontium, barium, lithium, cesium, and rubidium.

Usually it is desirable to remove the alkali metal cation by ion exchange and replace it with hydrogen, ammonium, or any desired metal ion. Accordingly, zeolites of the present invention may be a Na-form zeolite, a K-form zeolite, or a combined Na, K-form and the like, or may be an H-form zeolite, an ammonium-form zeolite, or a metal-exchanged zeolite. Typical ion exchange techniques involve contacting the synthetic zeolite with a solution containing a salt of the desired replacing cation or cations. Although a wide variety of salts can be employed, chlorides and other halides, nitrates, sulfates and carbonates are particularly preferred. Representative ion exchange techniques are widely known in the art. Ion exchange occurs post-synthesis and can take place either before or after the zeolite is calcined. Following contact with the salt solution of the desired replacing cation, the zeolite is typically washed with water and dried at temperatures ranging from 65° C. to about 315° C., usually between 80° C. and 150° C. After washing, the zeolite can be calcined in an inert gas and/or air at temperatures ranging from about 315° C. to 850° C. for periods of time ranging from 1 to 48 hours, or more, to produce a catalytically active and stable product.

The zeolite reaction admixture for an AEI synthesis process typically contains at least one source of silica, at least one source of alumina, at least one SDA useful in forming an AEI framework, and at least one source of hydroxide ions. Most preferably the reaction mixture employs an aluminosilicate zeolite of the FAU topological type as the source of aluminum.

The process can have an AEI yield based on the weight of the reaction mixture of ≥about 5%, ≥about 5.5%, ≥about 6%, ≥about 6.5%, ≥about 7%, ≥about 7.5%, or ≥about 8%.

The process can have a yield based on the SDA of ≥about 30%, ≥about 35%, ≥about 40%, ≥about 45%, ≥about 50%, ≥about 55%, ≥about 60%, ≥about 65%, ≥about 70%, ≥about 75%, ≥about 80%, ≥about 85%, ≥about 90%, or ≥about 95%.

Suitable silica sources include, without limitation, fumed silica, silicates, precipitated silica, colloidal silica, silica gels, zeolites such as zeolite Y and/or zeolite X, and silicon hydroxides and alkoxides. Silica sources resulting in a high relative yield are preferred. Typical alumina sources also are generally known and include aluminates, alumina, other zeolites such as zeolite FAU, aluminum colloids, boehmites, pseudo-boehmites, aluminum hydroxides, aluminum salts such as aluminum sulfate and alumina chloride, aluminum hydroxides and alkoxides, alumina gels. Treatment of zeolites, such as Y zeolite, by milling and/or calcination can improve the rate of AEI crystallization from the reaction mixture and reduce impurity phases.

Typically, a source of hydroxide ions such as an alkali metal hydroxide and/or an alkaline earth metal hydroxide, including hydroxide of sodium, potassium, lithium, cesium, rubidium, calcium, and magnesium, is used in the reaction mixture. However, this component can be omitted so long as the equivalent basicity is maintained. The SDA can be used to provide hydroxide ion. Thus, it may be beneficial to ion exchange, for example, the halide for hydroxide ion, thereby reducing or eliminating the alkali metal hydroxide quantity required. The alkali metal cation or alkaline earth cation may be part of the as-synthesized crystalline oxide material, in order to balance valence electron charges therein.

Salts, particularly alkali metal halides such as sodium chloride, can be added to or formed in the reaction mixture as well. Preferably, the AEI zeolite reaction admixture is free or substantially free of fluorine, fluorine-containing compounds, and fluorine ions.

A method of preparing a zeolite having an AEI framework comprises: a. forming a reaction mixture comprising a silica source, an alumina source, a base and an organic structure directing agent (SDA), where at least a portion of the alumina source is an FAU topological type zeolite, and b. reacting the reaction mixture at an elevated temperature for a period of time sufficient to form zeolite crystals having an AEI framework. The relative yield based on the weight of AEI to the weight of the reaction mixture can be ≥about 5%, ≥about 5.5%, ≥about 6%, ≥about 6.5%, ≥about 7%, ≥about 7.5%, or ≥about 8%.

A method for achieving a high yield based on the SDA in an AEI zeolite synthesis process comprises: (a) preparing an admixture comprising (i) at least one source of aluminum, (ii) at least one source of silica, (iii) at least one source of hydroxide ions, and (iv) at least one AEI structured directing agent (SDA); and b. reacting the admixture under crystallization conditions to form zeolite crystals having an AEI framework with a silica-to-alumina ratio (SAR) of about 8 to about 50, inclusive. The relative yield of AEI based on the SDA on a molar basis can be ≥about 30%, ≥about 35%, ≥about 40%, ≥about 45%, ≥about 50%, ≥about 55%, ≥about 60%, ≥about 65%, ≥about 70%, ≥about 75%, ≥about 80%, ≥about 85%, ≥about 90%, or ≥about 95%.

A method for achieving a high yield based on the weight of the reaction mixture in an AEI zeolite synthesis process comprises: (a.) preparing an admixture comprising (i) at least one source of aluminum, (ii) at least one source of silica, (iii) at least one source of hydroxide ions, and (iv) an AEI structured directing agent (SDA); and (b.) reacting the admixture under crystallization conditions to form zeolite crystals having an AEI framework with a silica-to-alumina ratio (SAR) of about 8 to about 50, inclusive, without the addition of mother liquor, where the yield of the weight of the AEI relative to the weight of the reaction mixture ≥about 5%, ≥about 5.5%, ≥about 6%, ≥about 6.5%, ≥ about 7%, ≥about 7.5%, or ≥about 8%.

In the above methods:

The admixture can be substantially free of fluorine, fluorine ions, and fluorine containing compounds.

The structure directing agents can be a cyclic or polycyclic quaternary ammonium cations. The structure directing agent can comprise one or more cations selected from the group consisting of N,N-dimethyl-3,5-dimethylpiperidinium, N,N-dimethyl-2-(2-hydroxyethyl)piperidinium, N,N-dimethyl-2-ethylpiperidinium, and 2,2,4,6,6-pentamethyl-2-azoniabycyclo[3.2.1]octane. The structure directing agent can be N,N-dimethyl-3,5-dimethylpiperidinium cation.

The silica source can be silica, waterglass (sodium silicate), dealuminated Y, NaY or USY.

The reaction mixture can comprise less than 1000, less than 750, less than 700, less than 650, or less than 600 moles of water per mole of alumina. Preferably the reaction mixture comprises about 580 moles of water per mole of alumina, where about means from 550 to 580 moles of water per mole of alumina.

The reaction mixture can comprise a mother liquor.

The relative yield based on the weight of AEI to the weight of the reaction mixture can be ≥about 5%, ≥about 5.5%, ≥about 6%, ≥about 6.5%, ≥about 7%, ≥about 7.5%, or ≥about 8%.

The yield based on the structure directing agent can be ≥about 30%, ≥about 35%, ≥about 40%, ≥about 45%, ≥about 50%, ≥about 55%, ≥about 60%, ≥about 65%, ≥about 70%, ≥about 75%, ≥about 80%, ≥about 85%, ≥about 90%, or ≥about 95%.

The reaction mixture can be in the form of a solution, a colloidal dispersion (colloidal sol), gel, or paste, with a gel being preferred. AEI can be prepared from a reaction mixture having the composition shown in Table 1. Silicon- and aluminum-containing reactants are expressed as $SiO_2$ and $Al_2O_3$, respectively. The ratios of the components have been normalized around $Al_2O_3$. This is due to observation in preliminary work that all of the aluminum in the reaction mixture is converted to product under the conditions described herein.

TABLE 1

| Reactants | Typical Ratio | Preferred Ratio |
|---|---|---|
| $SiO_2/Al_2O_3$ | 10-100 | 25-75 |
| $OH^-/SiO_2$ | 0.2-0.9 | 0.35-0.75 |
| $SDA/SiO_2$ | 0.01-0.20 | 0.04-0.12 |
| Alkali metal cation/$SiO_2$ | 0.20-1.0 | 0.30-0.60 |
| $H_2O/SiO_2$ | 4-60 | 6-30 |

One aspect of the invention is a composition comprises the following components: a silica source, an alumina source, a structure directing agent (SDA), a source of hydroxide ions and water, where the silica source and the alumina source are expressed as $SiO_2$ and $Al_2O_3$, respectively, and the components are present in the following ratios, where the endpoints are included:

| | |
|---|---|
| $SiO_2/Al_2O_3$ | 10-100 |
| $OH^-/SiO_2$ | 0.2-0.9 |
| $SDA/SiO_2$ | 0.01-0.20 |
| Alkali metal cation/$SiO_2$ | 0.20-1.0 |
| $H_2O/SiO_2$ | 4-60 |

The reactants in the composition can preferably be present in the following ratios, where the endpoints are included:

| | |
|---|---|
| $SiO_2/Al_2O_3$ | 25-75 |
| $OH^-/SiO_2$ | 0.35-0.75 |
| $SDA/SiO_2$ | 0.04-0.12 |
| Alkali metal cation/$SiO_2$ | 0.30-0.60 |
| $H_2O/SiO_2$ | 6-30 |

The above compositions, upon reacting at a temperature of between about 75 to about 220° C. for between 0.1 and 20 days, produce AEI zeolite.

Another aspect of the invention is the use of these compositions described above in forming an AEI zeolite.

One or more of these reactants can be present from a mother liquor, part of a solution remaining after crystallization of the AEI, from a previous synthesis.

In some embodiments, the reaction can be performed with the proviso that the reaction mixture does not comprise the addition or recycle of any mother liquor.

The reaction mixture uses lower amounts of template and water than were used in other synthesis.

For purpose of comparison, the reaction compositions disclosed in U.S. Pat. No. 5,958,370 were re-constructed with reactant molar ratios normalized based on alumina. The reaction mixtures had the components in the following ratios:

| | | | | | |
|---|---|---|---|---|---|
| Example 2-14 | $31SiO_2$ | $1.0Al_2O_3$ | $8.14Na_2O$ | $4.95R_AOH$ | $1413H_2O$ |
| Example 15: | $50SiO_2$ | $1.0Al_2O_3$ | $14.25Na_2O$ | $8.65R_BOH$ | $2460H_2O$ |
| Example 16: | $85.5SiO_2$ | $1.0Al_2O_3$ | $25.4Na_2O$ | $15.5R_BOH$ | $4400H_2O$ |
| Example 17: | $80.6SiO_2$ | $1.0Al_2O_3$ | $26.2Na_2O$ | $11.5R_BI$ | $2315H_2O$ |

The reaction mixtures disclosed in Moliner were also re-constructed with reactant molar ratios normalized based on alumina. The reaction mixtures had the components in the following ratios:

| | | | | | |
|---|---|---|---|---|---|
| A: | $30SiO_2$ | $1.0Al_2O_3$ | $7.2Na_2O$ | $5.1R_HOH$ | $1200H_2O$ |
| B: | $60SiO_2$ | $1.0Al_2O_3$ | $14.3Na_2O$ | $10.2R_HOH$ | $2400H_2O$ |
| C: | $60SiO_2$ | $1.0Al_2O_3$ | $14.3Na_2O$ | $10.2R_HOH$ | $1200H_2O$ |

The amount of water needed in the reaction mixtures described herein ($580H_2O$ per 1 $Al_2O_3$) is less than 50% of the lowest amount of water used in U.S. Pat. No. 5,958,370 ($1413H_2O$ per 1 $Al_2O_3$) or Moliner ($1200H_2O$ per 1 $Al_2O_3$).

Reaction temperatures, mixing times and speeds, and other process parameters that are suitable for conventional AEI synthesis techniques are also generally suitable for the present invention. Generally, the reaction mixture is maintained at an elevated temperature until the AEI zeolite crystals are formed. The hydrothermal crystallization is usually conducted under autogenous pressure, at a temperature between about 75-220° C., for example between about 100 and 175, preferably between 110 and 150° C., for a duration of several hours, for example, about 0.1-20 days, and preferably from about 0.25-3 days. Preferably, the zeolite is prepared using stirring or agitation.

During the hydrothermal crystallization step, the AEI crystals can be allowed to nucleate spontaneously from the reaction mixture. The use of AEI crystals as seed material can be advantageous in decreasing the time necessary for complete crystallization to occur. When used as seeds, AEI crystals are added in an amount between 0.1 and 10% of the weight of silica used in the reaction mixture.

Once the zeolite crystals have formed, the solid product is separated from the reaction mixture by standard separation techniques such as filtration. The crystals are water-washed and then dried, for several second to a few minutes (e.g., 5 second to 10 minutes for flash drying) or several hours (e.g., about 4-24 hours for oven drying at 75-150° C.), to obtain the as-synthesized AEI topological type zeolite crystals. The dying step can be performed at atmospheric pressure or under vacuum.

It will be appreciated that the foregoing sequence of steps, as well as each of the above-mentioned periods of time and temperature values are merely exemplary and may be varied.

The AEI zeolite crystals produced in accordance with this process can be uniform, with little to no twinning and/or multiple twinning or may form agglomerates.

The AEI zeolite crystals produced in accordance with the methods described herein have a mean crystalline size of about 0.01 to about 5 μm, for example about 0.5 to about 5 μm, about 0.1 to about 1 μm, and about 1 to about 5 μm. Large crystals can be milled using a jet mill or other particle-on-particle milling technique to an average size of about 1.0 to about 1.5 micron to facilitate washcoating a slurry containing the catalyst to a substrate, such as a flow-through monolith.

AEI topological type zeolites synthesized by the methods described herein preferably have a silica-to-alumina ratio (SAR) of ≥8, for example about 8 to about 50, about 10 to about 35, or about 11 to about 26. The SAR can be selectively achieved based on the composition of the starting synthesis mixture and/or adjusting other process variables. The silica-to-alumina ratio of zeolites may be determined by conventional analysis. This ratio is meant to represent, as closely as possible, the ratio in the rigid atomic framework of the zeolite crystal and to exclude silicon or aluminum in the binder (for catalyst applications) or, in cationic or other form, within the channels or present in an impurity phase.

The AEI topological type zeolite is useful as a catalyst in certain applications. The dried molecular sieve AEI crystals are preferably calcined, but can also be used without calcination. The catalyst containing AEI topological type zeolite can also be used either without a post-synthesis metal exchange or with a post-synthesis metal exchange. Thus, in certain aspects of the invention, provided is a catalyst comprising an AEI topological type zeolite, wherein the AEI topological type zeolite is free or essentially free of any exchanged metal, particularly post-synthesis exchanged or impregnated metals. A catalyst can comprise an AEI topological type zeolite containing one or more catalytic metal ions exchanged or otherwise impregnated into the channels and/or cavities of the zeolite. Examples of metals that can be post-zeolite synthesis exchanged or impregnated include transition metals, including copper, nickel, zinc, iron, tungsten, molybdenum, cobalt, titanium, zirconium, manganese, chromium, vanadium, niobium, as well as tin, bismuth, and antimony; noble metals including platinum group metals (PGMs), such as ruthenium, rhodium, palladium, indium, platinum, and precious metals such as gold and silver; alkaline earth metals such as beryllium, magnesium, calcium, strontium, and barium; and rare earth metals such as lanthanum, cerium, praseodymium, neodymium, europium, terbium, erbium, ytterbium, and yttrium. Preferred transition metals for post-synthesis exchange are base metals, and preferred base metals include those selected from the group consisting of manganese, iron, cobalt, nickel, copper and mixtures thereof.

The transition metal can be present in an amount of about 0.1 to about 10 weight percent, for example about 0.5 to about 5 weigh percent, about 0.1 to about 1.0 weight percent, about 2.5 to about 3.5 weight percent, and about 4.5 to about 5.5 weight percent, wherein the weight percent is relative to the total weight of the zeolite material.

Particularly preferred exchanged metals include copper and iron, particularly when combined with calcium and/or cerium and particularly when the transition metals ($T_M$) and the alkaline metals ($A_M$) are present in a $T_M$:$A_M$ molar ratio of about 15:1 to about 1:1, for example about 10:1 to about 2:1, about 10:1 to about 3:1, or about 6:1 to about 4:1, Metals incorporated post-synthesis can be added to the molecular sieve via any known technique such as ion exchange, impregnation, isomorphous substitution, etc.

These exchanged metal cations are distinct from metals constituting the molecular framework of the zeolite, and thus metal exchanged zeolites are distinct from metal-substituted zeolites.

Where the catalyst is part of a washcoat composition, the washcoat may further comprise a binder containing Ce or ceria. When the binder contains Ce or ceria, the Ce containing particles in the binder are significantly larger than the Ce containing particles in the catalyst.

Catalysts of the present invention are particularly applicable for heterogeneous catalytic reaction systems (i.e., solid catalyst in contact with a gas reactant). To improve contact surface area, mechanical stability, and/or fluid flow characteristics, the catalysts can be disposed on and/or within a substrate, preferably a porous substrate. A washcoat containing the catalyst can be applied to an inert substrate, such as corrugated metal plate or a honeycomb cordierite brick. Alternatively, the catalyst is kneaded along with other components such as fillers, binders, and reinforcing agents, into an extrudable paste which is then extruded through a die to form a honeycomb brick. Accordingly, a catalyst article can comprise an AEI catalyst described herein coated on and/or incorporated into a substrate.

Certain aspects of the invention provide a catalytic washcoat. The washcoat comprising the AEI catalyst described herein is preferably a solution, suspension, or slurry. Suitable coatings include surface coatings, coatings that penetrate a portion of the substrate, coatings that permeate the substrate, or some combination thereof.

A washcoat can also include non-catalytic components, such as fillers, binders, stabilizers, rheology modifiers, and other additives, including one or more of alumina, silica, non-zeolite silica alumina, titania, zirconia, ceria. The catalyst composition can comprise pore-forming agents such as graphite, cellulose, starch, polyacrylate, and polyethylene, and the like. These additional components do not necessarily catalyze the desired reaction, but instead improve the catalytic material's effectiveness, for example, by increasing its operating temperature range, increasing contact surface area of the catalyst, increasing adherence of the catalyst to a substrate, etc. The washcoat loading on, or in, the substrate can be between about 0.3 g/in$^3$ to about 3.5 g/in$^3$, where the endpoints may be included. The loading can be a function of the type of substrate used and the backpressure that results from the loading on a specific type of substrate. The lower limit for the washcoat loading can be 0.5 g/in$^3$, 0.8 g/in$^3$, 1.0 g/in$^3$, 1.25 g/in$^3$, or 1.5 g/in$^3$. The upper limit for the washcoat loading can be 3.5 g/in$^3$, 3.25 g/in$^3$, 3.0 g/in$^3$, 2.75 g/in$^3$, 2.5 g/in$^3$, 2.25 g/in$^3$, 2.0 g/in$^3$, 1.75 g/in$^3$ or 1.5 g/in$^3$.

Two of the most common substrate designs to which catalyst may be applied are plate and honeycomb. Preferred substrates, particularly for mobile applications, include flow-through monoliths having a so-called honeycomb geometry that comprise multiple adjacent, parallel channels that are open on both ends and generally extend from the inlet face to the outlet face of the substrate and result in a high-surface area-to-volume ratio. For certain applications, the honeycomb flow-through monolith preferably has a high cell density, for example about 600 to 800 cells per square inch, and/or an average internal wall thickness of about 0.18-0.35 mm, preferably about 0.20-0.25 mm. For certain other applications, the honeycomb flow-through monolith preferably has a low cell density of about 150-600 cells per square inch, more preferably about 200-400 cells per square inch. Preferably, the honeycomb monoliths are porous. In addition to cordierite, silicon carbide, silicon nitride, ceramic, and metal, other materials that can be used for the substrate include aluminum nitride, silicon nitride, aluminum titanate, α-alumina, mullite, e.g., acicular mullite, pollucite, a thermet such as $Al_2OsZFe$, $Al_2O_3$/Ni or $B_4CZFe$, or composites comprising segments of any two or more thereof. Preferred materials include cordierite, silicon carbide, and alumina titanate.

Plate-type catalysts have lower pressure drops and are less susceptible to plugging and fouling than the honeycomb types, which is advantageous in high efficiency stationary applications, but plate configurations can be much larger and more expensive. A honeycomb configuration is typically smaller than a plate type, which is an advantage in mobile applications, but has higher pressure drops and plug more easily. The plate substrate can be constructed of metal, preferably corrugated metal.

In one aspect of the invention, a catalyst article is made by a process described herein. The catalyst article can be produced by a process that includes the steps of applying an AEI catalyst composition, preferably as a washcoat, to a substrate as a layer either before or after at least one additional layer of another composition for treating exhaust gas has been applied to the substrate. The one or more catalyst layers on the substrate, including the AEI catalyst layer, are arranged in consecutive layers. As used herein, the term "consecutive" with respect to catalyst layers on a substrate means that each layer is contact with its adjacent layer(s) and that the catalyst layers as a whole are arranged one on top of another on the substrate.

The AEI catalyst can be disposed on the substrate as a first layer or zone and another composition, such as an oxidation catalyst, reduction catalyst, scavenging component, or $NO_x$ storage component, can be disposed on the substrate as a second layer or zone. As used herein, the terms "first layer" and "second layer" are used to describe the relative positions of catalyst layers in the catalyst article with respect to the normal direction of exhaust gas flow-through, past, and/or over the catalyst article. Under normal exhaust gas flow conditions, exhaust gas contacts the first layer prior to contacting the second layer. The second layer can be applied to an inert substrate as a bottom layer and the first layer is a top layer that is applied over the second layer as a consecutive series of sub-layers.

The exhaust gas can penetrate (and hence contact) the first layer, before contacting the second layer, and subsequently returns through the first layer to exit the catalyst component.

The first layer can be a first zone disposed on an upstream portion of the substrate and the second layer is disposed on the substrate as a second zone, wherein the second zone is downstream of the first.

The catalyst article can be produced by a process that includes the steps of applying an AEI catalyst composition, preferably as a washcoat, to a substrate as a first zone, and subsequently applying at least one additional composition for treating an exhaust gas to the substrate as a second zone, wherein at least a portion of the first zone is downstream of the second zone. Alternatively, the AEI catalyst composition can be applied to the substrate in a second zone that is downstream of a first zone containing the additional composition. Examples of additional compositions include oxidation catalysts, reduction catalysts, scavenging components (e.g., for sulfur, water, etc.), or $NO_x$ storage components.

To reduce the amount of space required for an exhaust system, individual exhaust components can be designed to perform more than one function. For example, applying an SCR catalyst to a wall-flow filter substrate instead of a flow-through substrate serves to reduce the overall size of an exhaust treatment system by allowing one substrate to serve two functions, namely catalytically reducing $NO_x$ concentration in the exhaust gas and mechanically removing soot from the exhaust gas. The substrate can be a honeycomb wall-flow filter or partial filter. Wall-flow filters are similar to flow-through honeycomb substrates in that they contain a plurality of adjacent, parallel channels. However, the channels of flow-through honeycomb substrates are open at both ends, whereas the channels of wall-flow substrates have one end capped, wherein the capping occurs on opposite ends of adjacent channels in an alternating pattern. Capping alternating ends of channels prevents the gas entering the inlet face of the substrate from flowing straight through the channel and existing. Instead, the exhaust gas enters the front of the substrate and travels into about half of the channels where it is forced through the channel walls prior to entering the second half of the channels and exiting the back face of the substrate.

The substrate wall has a porosity and pore size that is gas permeable, but traps a major portion of the particulate matter, such as soot, from the gas as the gas passes through the wall. Preferred wall-flow substrates are high efficiency filters. Wall flow filters for use with the present invention preferably have an efficiency of least 70%, ≥ about 75%, ≥about 80%, or ≥about 90%. The efficiency can be from about 75 to about 99%, about 75 to about 90%, about 80 to about 90%, or about 85 to about 95%. Here, efficiency is relative to soot and other similarly sized particles and to particulate concentrations typically found in conventional diesel exhaust gas. For example, particulates in diesel exhaust can range in size from 0.05 microns to 2.5 microns. Thus, the efficiency can be based on this range or a sub-range, such as 0.1 to 0.25 microns, 0.25 to 1.25 microns, or 1.25 to 2.5 microns.

Porosity is a measure of the percentage of void space in a porous substrate and is related to backpressure in an exhaust system: generally, the lower the porosity, the higher the backpressure. Preferably, the porous substrate has a porosity of about 30 to about 80%, for example about 40 to about 75%, about 40 to about 65%, or from about 50 to about 60%.

The pore interconnectivity, measured as a percentage of the substrate's total void volume, is the degree to which pores, void, and/or channels, are joined to form continuous paths through a porous substrate, i.e., from the inlet face to the outlet face. In contrast to pore interconnectivity is the sum of closed pore volume and the volume of pores that have a conduit to only one of the surfaces of the substrate. Preferably, the porous substrate has a pore interconnectivity volume of ≥about 30%, more preferably ≥about 40%.

The mean pore size of the porous substrate is also important for filtration. Mean pore size can be determined by any acceptable means, including by mercury porosimetry. The mean pore size of the porous substrate should be of a high enough value to promote low backpressure, while providing an adequate efficiency by either the substrate per se, by promotion of a soot cake layer on the surface of the substrate, or combination of both. Preferred porous substrates have a mean pore size of about 10 to about 40 μm, for example about 20 to about 30 μm, about 10 to about 25 μm, about 10 to about 20 μm, about 20 to about 25 μm, about 10 to about 15 μm, and about 15 to about 20 μm.

In general, the production of an extruded solid body, such as honeycomb flow-through or wall-flow filter, containing the AEI catalyst involves blending the AEI catalyst, a binder, an optional organic viscosity-enhancing compound into a homogeneous paste which is then added to a binder/matrix component or a precursor thereof and optionally one or more of stabilized ceria, and inorganic fibers. The blend is compacted in a mixing or kneading apparatus or an extruder. The mixtures have organic additives such as binders, pore formers, plasticizers, surfactants, lubricants, dispersants as processing aids to enhance wetting and therefore produce a uniform batch. The resulting plastic material is then molded, in particular using an extrusion press or an extruder including an extrusion die, and the resulting moldings are dried and calcined. The organic additives are "burnt out" during calcinations of the extruded solid body. An AEI zeolite catalyst may also be washcoated or otherwise applied to the extruded solid body as one or more sub-layers that reside on the surface or penetrate wholly or partly into the extruded solid body.

The binder/matrix component is preferably selected from the group consisting of cordierite, nitrides, carbides, borides, intermetallics, lithium aluminosilicate, a spinel, an optionally doped alumina, a silica source, titania, zirconia, titania-zirconia, zircon and mixtures of any two or more thereof. The paste can optionally contain reinforcing inorganic fibers selected from the group consisting of carbon fibers, glass fibers, metal fibers, boron fibers, alumina fibers, silica fibers, silica-alumina fibers, silicon carbide fibers, potassium titanate fibers, aluminum borate fibers and ceramic fibers.

The alumina binder/matrix component is preferably gamma alumina, but can be any other transition alumina, i.e., alpha alumina, beta alumina, chi alumina, eta alumina, rho alumina, kappa alumina, theta alumina, delta alumina, lanthanum beta alumina and mixtures of any two or more such transition aluminas. It is preferred that the alumina is doped with at least one non-aluminum element to increase the thermal stability of the alumina. Suitable alumina dopants include silicon, zirconium, barium, lanthanides and mixtures of any two or more thereof. Suitable lanthanide dopants include La, Ce, Nd, Pr, Gd and mixtures of any two or more thereof.

Preferably, the AEI catalyst is dispersed throughout, and preferably evenly throughout, the entire extruded catalyst body.

Where any of the above extruded solid bodies are made into a wall-flow filter, the porosity of the wall-flow filter can be from 30-80%, such as from 40-70%. Porosity and pore volume and pore radius can be measured e.g. using mercury intrusion porosimetry.

The AEI catalyst described herein can promote the reaction of a reductant, preferably ammonia, with nitrogen oxides to selectively form elemental nitrogen ($N_2$) and water ($H_2O$). Thus, the catalyst can be formulated to favor the reduction of nitrogen oxides with a reductant (i.e., an SCR catalyst). Examples of such reductants include hydrocarbons (e.g., C3-C6 hydrocarbons) and nitrogenous reductants such as ammonia and ammonia hydrazine or any suitable ammonia precursor, such as urea (($NH_2)_2CO$), ammonium carbonate, ammonium carbamate, ammonium hydrogen carbonate or ammonium formate.

The AEI catalyst described herein can also promote the oxidation of ammonia. The catalyst can be formulated to favor the oxidation of ammonia with oxygen, particularly a concentrations of ammonia typically encountered downstream of an SCR catalyst (e.g., ammonia oxidation (AMOX) catalyst, such as an ammonia slip catalyst (ASC)). The AEI catalyst can be disposed as a top layer over an oxidative under-layer, wherein the under-layer comprises a platinum group metal (PGM) catalyst or a non-PGM catalyst. Preferably, the catalyst component in the underlayer is disposed on a high surface area support, including but not limited to alumina.

SCR and AMOX operations can be performed in series, wherein both processes utilize a catalyst comprising the AEI catalyst described herein, and wherein the SCR process occurs upstream of the AMOX process. For example, an SCR formulation of the catalyst can be disposed on the inlet side of a filter and an AMOX formulation of the catalyst can be disposed on the outlet side of the filter.

Accordingly, provided is a method for the reduction of $NO_x$ compounds or oxidation of $NH_3$ in a gas, which comprises contacting the gas with a catalyst composition described herein for the catalytic reduction of $NO_x$ compounds for a time sufficient to reduce the level of $NO_x$ compounds and/or $NH_3$ in the gas. A catalyst article can have an ammonia slip catalyst disposed downstream of a selective catalytic reduction (SCR) catalyst. The ammonia slip catalyst can oxidize at least a portion of any nitrogenous reductant that is not consumed by the selective catalytic reduction process. The ammonia slip catalyst can be disposed on the outlet side of a wall flow filter and an SCR catalyst can be disposed on the upstream side of a filter. The ammonia slip catalyst can be disposed on the downstream end of a flow-through substrate and an SCR catalyst can be disposed on the upstream end of the flow-through substrate. The ammonia slip catalyst and SCR catalyst can be disposed on separate bricks within the exhaust system. These separate bricks can be adjacent to, and in contact with, each other or separated by a specific distance, provided that they are in fluid communication with each other and provided that the SCR catalyst brick is disposed upstream of the ammonia slip catalyst brick.

The SCR and/or AMOX process can be performed at a temperature of ≥100° C., preferably at a temperature from about 150° C. to about 750° C., more preferably from about 175° C. to about 550° C., even more preferably from about 175° C. to about 400° C.

In some uses, the temperature range can be 450° C. to 900° C., preferably 500° C. to 750° C., more preferably from 500° C. to 650° C.

In other uses, the temperature range can be 450° C. to 550° C., or 650° C. to 850° C.

Temperatures greater than 450° C. are particularly useful for treating exhaust gases from a heavy and light duty diesel engine that is equipped with an exhaust system comprising (optionally catalyzed) diesel particulate filters which are regenerated actively, e.g. by injecting hydrocarbon into the exhaust system upstream of the filter, wherein the zeolite catalyst for use in the present invention is located downstream of the filter.

According to another aspect of the invention, provided is a method for the reduction of $NO_x$ compounds and/or oxidation of $NH_3$ in a gas, which comprises contacting the gas with a catalyst described herein for a time sufficient to reduce the level of $NO_x$ compounds in the gas. Methods of the present invention may comprise one or more of the following steps: (a) accumulating and/or combusting soot that is in contact with the inlet of a catalytic filter; (b) introducing a nitrogenous reducing agent into the exhaust gas stream prior to contacting the catalytic filter, preferably with no intervening catalytic steps involving the treatment of $NO_x$ and the reductant; (c) generating $NH_3$ over a $NO_x$ adsorber catalyst or lean $NO_x$ trap, and preferably using such $NH_3$ as a reductant in a downstream SCR reaction; (d) contacting the exhaust gas stream with a DOC to oxidize hydrocarbon based soluble organic fraction (SOF) and/or carbon monoxide into $CO_2$, and/or oxidize NO into $NO_2$, which in turn, may be used to oxidize particulate matter in particulate filter; and/or reduce the particulate matter (PM) in the exhaust gas; (e) contacting the exhaust gas with one or more flow-through SCR catalyst device(s) in the presence of a reducing agent to reduce the $NO_x$ concentration in the exhaust gas; and (f) contacting the exhaust gas with an ammonia slip catalyst, preferably downstream of the SCR catalyst to oxidize most, if not all, of the ammonia prior to emitting the exhaust gas into the atmosphere or passing the exhaust gas through a recirculation loop prior to exhaust gas entering/re-entering the engine.

All or at least a portion of the nitrogen-based reductant, particularly $NH_3$, for consumption in the SCR process can be supplied by a $NO_x$ adsorber catalyst (NAC), a lean $NO_x$ trap (LNT), or a $NO_x$ storage/reduction catalyst (NSRC), disposed upstream of the SCR catalyst, e.g., a SCR catalyst of the present invention disposed on a wall-flow filter. NAC components useful in the present invention include a catalyst combination of a basic material (such as alkali metal, alkaline earth metal or a rare earth metal, including oxides of alkali metals, oxides of alkaline earth metals, and combinations thereof), and a precious metal (such as platinum), and optionally a reduction catalyst component, such as rhodium. Specific types of basic material useful in the NAC include cesium oxide, potassium oxide, magnesium oxide, sodium oxide, calcium oxide, strontium oxide, barium oxide, and combinations thereof. The precious metal is preferably present at about 10 to about 200 g/ft$^3$, such as 20 to 60 g/ft$^3$. Alternatively, the precious metal of the catalyst is characterized by the average concentration which may be from about 40 to about 100 grams/ft$^3$.

Under certain conditions, during the periodically rich regeneration events, $NH_3$ may be generated over a $NO_x$ adsorber catalyst. The SCR catalyst downstream of the $NO_x$ adsorber catalyst may improve the overall system $NO_x$ reduction efficiency. In the combined system, the SCR catalyst is capable of storing the released $NH_3$ from the NAC catalyst during rich regeneration events and utilizes the stored $NH_3$ to selectively reduce some or all of the $NO_x$ that slips through the NAC catalyst during the normal lean operation conditions.

The method for treating exhaust gas as described herein can be performed on an exhaust gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, etc. The method can be used for treating exhaust gas from a vehicular lean burn internal combustion engine, such as a diesel engine, a lean-burn gasoline engine or an engine powered by liquid petroleum gas or natural gas.

In certain aspects, the invention is a system for treating exhaust gas generated by combustion process, such as from an internal combustion engine (whether mobile or stationary), a gas turbine, coal or oil fired power plants, and the like. Such systems include a catalytic article comprising the AEI catalyst described herein and at least one additional component for treating the exhaust gas, wherein the catalytic article and at least one additional component are designed to function as a coherent unit.

A system can comprise a catalytic article comprising an AEI catalyst described herein, a conduit for directing a flowing exhaust gas, a source of nitrogenous reductant disposed upstream of the catalytic article. The system can include a controller for the metering the nitrogenous reductant into the flowing exhaust gas only when it is determined that the zeolite catalyst is capable of catalyzing $NO_x$ reduction at or above a desired efficiency, such as at above 100° C., above 150° C. or above 175° C. The metering of the nitrogenous reductant can be arranged such that 60% to 200% of theoretical ammonia is present in exhaust gas entering the SCR catalyst calculated at 1:1 $NH_3$/NO and 4:3 $NH_3/NO_2$.

The system comprises an oxidation catalyst (e.g., a diesel oxidation catalyst (DOC)) for oxidizing nitrogen monoxide in the exhaust gas to nitrogen dioxide can be located upstream of a point of metering the nitrogenous reductant into the exhaust gas. The oxidation catalyst can be adapted to yield a gas stream entering the SCR zeolite catalyst having a ratio of NO to $NO_2$ of from about 4:1 to about 1:3 by volume, e.g. at an exhaust gas temperature at oxidation catalyst inlet of 250° C. to 450° C. The oxidation catalyst can include at least one platinum group metal (or some combination of these), such as platinum, palladium, or rhodium, coated on a flow-through monolith substrate. The at least one platinum group metal can be platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

A suitable filter substrate is located between the oxidation catalyst and the SCR catalyst. Filter substrates can be selected from any of those mentioned above, e.g. wall flow filters. Where the filter is catalyzed, e.g. with an oxidation catalyst of the kind discussed above, preferably the point of metering nitrogenous reductant is located between the filter and the zeolite catalyst. Alternatively, if the filter is uncatalyzed, the means for metering nitrogenous reductant can be located between the oxidation catalyst and the filter.

The AEI catalyst described herein can also promote the formation of methylamines from the reaction of methanol and ammonia and the conversion of methanol to lower olefins, especially ethylene and propylene.

EXAMPLES

Samples of AEI were prepared by mixing the appropriate amounts of a silica source, an alumina source, a base and an organic structure directing agent (SDA) shown below to form a gelled reaction media, where the silica source comprises one or more of a silica, waterglass (sodium silicate), dealuminated Y (an FAU topological type zeolite) NaY and USY (ultrastabilized Y), the alumina source comprises and dealuminated Y (an FAU topological type zeolite), the base comprises one or more of sodium hydroxide, waterglass and silica and the structure directing agent is N,N-Diethyl-3,5-dimethylpiperidinium hydroxide.

Example 1

AEI zeolite powder with a $SiO_2/Al_2O_3$ molar ratio (SAR) of 19.4 was synthesized according to the following procedure. A synthesis gel was formed by mixing 35.0 g of an industrial dealuminated USY ($Al_2O_3$=11.79 wt %, $SiO_2$=74.31 wt %), 945.7 g of demineralized water, 303.15 g of N,N-diethyl-3,5-dimethylpiperidinium hydroxide solution (20.0% aqueous concentration) and 416.15 g of sodium silicate solution ($Na_2O$ wt %=9.00 wt %, $SiO_2$=28.8 wt %) in a stainless steel beaker at ambient temperature with agitation. The resulting synthesis gel was charged into a 2 liter autoclave for reaction and crystallization of AEI product. Under agitation, the autoclave was heated to a target temperature of 145° C. in about 40 minutes and kept at the target temperature. After 49 hours of crystallization, the solid product was recovered by filtration and washed with demineralized water until the pH of the filtrate dropped to 10 or below. The filtered wet cake was dried in an oven at 120° C. for about 10 hours and the as-made product containing the SDA was formed.

The as-made product was then calcined to remove the SDA species in a muffler furnace by increasing the temperature to 550° C. with a ramping rate of 1.0° C. per minute. After 6 hours of calcination, the resulting powder was subject to two cycles of ion exchange with ammonium acetate (10 g of solution for gram of zeolite powder, 10% ammonium acetate, 80° C. and 1 hour per ion exchange cycle). After removing sodium by ion exchange, the solid product was again dried at 120° C. and calcined at 550° C. with the same procedure. The resulting activated form of zeolite was a highly crystallized AEI as confirmed by XRD.

Examples 2-7

Examples 2-7 were prepared using methods of the invention and used N,N-diethyl-3,5-dimethylpiperidinium as the SDA. These examples were performed in a 2.0 L reactor at a temperature of 160° C. for 3 days, except for Example 3, which was performed in a 0.6 L reactor at a temperature of 145° C. for 1 day. In the description of "Zeolite Used", the term "Heat-treated" means the as-received NaY was calcined at 600° C. for 2 hrs before use in AEI synthesis. Each of the AEI samples produced had $Na_2O$ wt %=0.0. The USY with an SAR~11 is similar to LZ-210, having an SAR of 13, used in Examples 3-14 of U.S. Pat. No. 5,958,370.

The yields in the tables below ("Yield") are the isolated weight of AEI compared to the weight of the reaction mixture (gel). Yields are also shown based on the SDA. These yields were estimated based on the experimental data as described below: $W_1$ grams of as-made AEI was recovered from $W_2$ grams of the initial reaction gel; the SDA content, $W_{SDA}$ wt %, of the as-made AEI was measured by Thermogravimetric Analysis (TGA), activated AEI content (i.e., the sum of silica and alumina content), $W_{AEI}$ wt %, were measured by X-ray fluorescence (XRF); the AEI yield was estimated as $W_1 * W_{AEI}$ wt %/$W_2$, and the yield based on SDA was estimated as $W_1 * W_{SDA}$ wt %/$W_2$.

Reaction Gel Composition
Zeolite Used

| Example | AEI Product SAR | AEI Yield | Yield on SDA |
|---|---|---|---|
| 1. | $60SiO_2$—$1.00Al_2O_3$—$14.9Na_2O$—$8.0R_HOH$—$2000H_2O$, | | |
| | AEI product—SAR~19.4 | AEI Yield~3.0% | Yield on SDA = 24.6% |
| 2. | $68.0SiO_2$—$1.00Al_2O_3$—$17.4Na_2O$—$4.00R_HOH$—$580H_2O$, USY with SAR~11 | | |
| | AEI Product SAR = 19.0 | AEI Yield~7.6% | Yield on SDA = 48.0% |
| 3. | $68.0SiO_2$—$1.00Al_2O_3$—$20.0Na_2O$—$3.00R_HOH$—$580H_2O$, NaY with SAR~5.0-5.2—Heat treated | | |
| | AEI Product SAR = 14.4 | AEI Yield~5.9% | Yield on SDA = 49.5% |
| 4. | $69.0SiO_2$—$1.00Al_2O_3$—$17.0Na_2O$—$3.00R_HOH$—$580H_2O$, NaY with SAR~5.0-5.2—Heat treated | | |
| | AEI Product SAR = 19.4 | AEI Yield~8.0% | Yield on SDA = 65.2% |
| 5. | $68.0SiO_2$—$1.00Al_2O_3$—$15.5Na_2O$—$4.00R_HOH$~$580H_2O$ NaY with SAR~5.0-5.2—Heat treated, 40 g AEI seeds | | |
| | AEI Product SAR = 20.9 | AEI Yield~8.0% | Yield on SDA = 52.5% |
| 6. | $68.0SiO_2$—$1.00Al_2O_3$—$16.8Na_2O$—$5.40R_HOH$—$580H_2O$ Zeolite Y in Ammonium form with SAR = 5.2 | | |
| | AEI Product SAR = 17.7 | AEI Yield~7.1% | Yield on SDA = 33.3% |
| 7. | $68.0SiO_2$—$1.00Al_2O_3$—$16.8Na_2O$—$5.40R_HOH$—$580H_2O$, NaY (treated at 600° C.) | | |
| | AEI Product SAR = 18.0 | AEI Yield~7.2% | Yield on SDA = 33.8% |

The AEI yields and the yields based on the SDA are shown in the Table below.

| Example | AEI Yield | Yield on SDA |
|---|---|---|
| 1. | 3.0% | 24.6% |
| 2. | 7.6% | 48.0% |
| 3. | 5.9% | 49.5% |
| 4. | 8.0% | 65.2% |
| 5. | 8.0% | 52.5% |
| 6. | 7.1% | 33.3% |
| 7. | 7.2% | 33.8% |

The above table shows that the AEI yields using the methods described herein, were between 5.9 and 8.0%, which is about twice that of the yield using the method known in the art (3.0%)

The above table shows that the yield based on the SDA using the methods described herein, were between 33 and 65%, which is greater than the yield based on SDA using a method known in the art (24.6%).

Example 8

17.25 g of sodium hydroxide (98%) was dissolved in 210.2 g of de-mineralized water in a stainless steel beaker under agitation. To the resulting solution, 61.9 g of a commercial USY powder ($Al_2O_3$=18.32 wt %, $SiO_2$=58.71 wt %, $Na_2O$=0.08 wt %) was added to form a white homogeneous slurry. Next, 62.2 g of N,N-diethyl-3,5-dimethylpiperidinium hydroxide solution (55.8% aqueous concentration) and then 1452.3 g of sodium silicate solution ($Na_2O$ wt %=9.00 wt %, $SiO_2$=28.8 wt %) were sequentially poured into the mixture. The resulting synthesis gel, corresponding to a molar gel formulae of $68.0SiO_2$-$1.00Al_2O_3$-$21.0Na_2O$-$1.50R_HOH$-$580H_2O$, was agitated for 30 minutes and then placed into a 2.0 L agitated autoclave for crystallization at 120° C. After 44 hours of crystallization, the solid product was recovered and processed to an activated form of zeolite following the same procedure described in Example 1. The activated form of the resulting zeolite was a pure phase of AEI as confirmed by XRD. The SAR of the resulting zeolite was 12.7 as measured by XRF. The AEI yield was 5.3% and the SDA yield was 73%.

Example 9

15.77 g of sodium hydroxide (98%) was dissolved in 174.5 g of de-mineralized water in a stainless steel beaker under agitation. To the resulting solution, 61.0 g of a commercial USY powder ($Al_2O_3$=18.32 wt %, $SiO_2$=58.71 wt %, $Na_2O$=0.08 wt %) was added to form a white homogeneous slurry. Next, 122.7 g of N,N-diethyl-3,5-dimethylpiperidinium hydroxide solution (55.8% aqueous concentration) and then 1431.2 g of sodium silicate solution ($Na_2O$ wt %=9.00 wt %, $SiO_2$=28.8 wt %) were sequentially poured into the mixture. The resulting synthesis gel, corresponding to a molar gel formulae of $68.0SiO_2$-$1.00Al_2O_3$-$21.0Na_2O$-$3.00R_HOH$-$580H_2O$, was agitated for 30 minutes and then placed into a 2.0 L agitated autoclave for crystallization at 120° C. After 42 hours of crystallization, the solid product was recovered and processed to an activated form of zeolite following the same procedure described in Example 1. The activated form of the resulting zeolite was a pure phase of AEI as confirmed by XRD. The SAR of the resulting zeolite was 13.6 as measured by XRF. The AEI yield was 5.6% and the SDA yield was 43%.

Example 10

3.42 g of sodium hydroxide (98%) was dissolved in 86.9 g of de-mineralized water in a stainless steel beaker under agitation. To the resulting solution, 30.6 g of a commercial USY powder ($Al_2O_3$=18.32 wt %, $SiO_2$=58.71 wt %, $Na_2O$=0.08 wt %) was added to form a white homogeneous slurry. Next, 61.6 g of N,N-diethyl-3,5-dimethylpiperidinium hydroxide solution (55.8% aqueous concentration) and then 718.3 g of sodium silicate solution ($Na_2O$ wt %=9.00 wt %, $SiO_2$=28.8 wt %) were sequentially poured into the mixture. The resulting synthesis gel, corresponding to a molar gel formulae of $68.0SiO_2$-$1.00Al_2O_3$-$20.0Na_2O$-$3.00R_HOH$-$580H_2O$, was agitated for 30 minutes and then placed into a 2.0 L agitated autoclave for crystallization at 125° C. After 21 hours of crystallization, the solid product was recovered and processed to an activated form of zeolite following the same procedure described in Example 1. The activated form of the resulting zeolite was a pure phase of AEI as confirmed by XRD. The SAR of the resulting zeolite was 15.1 as measured by XRF. The AEI yield was 6.2% and the SDA yield was 50%.

Example 11

3.94 g of sodium hydroxide (98%) was dissolved in 49.5 g of de-mineralized water in a stainless steel beaker under agitation. To the resulting solution, 13.83 g of a commercial USY powder ($Al_2O_3$=18.32 wt %, $SiO_2$=58.71 wt %, $Na_2O$=0.08 wt %) was added to form a white homogeneous slurry. Next, 9.29 g of N,N-diethyl-3,5-dimethylpiperidinium hydroxide solution (55.8% aqueous concentration) and then 324.3 g of sodium silicate solution ($Na_2O$ wt %=9.00 wt %, $SiO_2$=28.8 wt %) were sequentially poured into the mixture. The resulting synthesis gel, corresponding to a molar gel formulae of $68.0SiO_2$-$1.00Al_2O_3$-$21.0Na_2O$-$1.00RHOH$-$580H_2O$, was agitated for 30 minutes and then placed into a 0.6 L agitated autoclave for crystallization at 120° C. After 45 hours of crystallization, the solid product was recovered and processed to an activated form of zeolite following the same procedure described in Example 1. The activated form of the resulting zeolite was a highly crystallized AEI as confirmed by XRD. The SAR of the resulting zeolite was 11.7 as measured by XRF. The AEI yield was 5.0% and the SDA yield was 94%.

Example 12

4.00 g of sodium hydroxide (98%) was dissolved in 50.6 g of de-mineralized water in a stainless steel beaker under agitation. To the resulting solution, 13.86 g of a commercial USY powder ($Al_2O_3$=18.32 wt %, $SiO_2$=58.71 wt %, $Na_2O$=0.08 wt %) was added to form a white homogeneous slurry. Next, 7.44 g of N,N-diethyl-3,5-dimethylpiperidinium hydroxide solution (55.8% aqueous concentration) and then 325.0 g of sodium silicate solution ($Na_2O$ wt %=9.00 wt %, $SiO_2$=28.8 wt %) were sequentially poured into the mixture. The resulting synthesis gel, corresponding to a molar gel formulae of $68.0SiO_2$-$1.00Al_2O_3$-$21.0Na_2O$-$0.80R_HOH$-$580H_2O$, was agitated for 30 minutes and then placed into a 2.0 L agitated autoclave for crystallization at 120° C. After 66 hours of crystallization, the solid product was recovered and processed to an activated form of zeolite following the same procedure described in Example 1. The activated form of the resulting zeolite was a highly crystallized AEI as confirmed by XRD. The SAR of the resulting zeolite was 10.9 as measured by XRF. The AEI yield was 4.7% and the SDA yield was 97%.

The methods described herein also differ from the described known methods in the amount of SDA required. Since all of the aluminium in the reaction gel is converted to AEI, the most meaning way to quantify template consumption is the molar ratio of the template vs $Al_2O_3$. This proportionally reflects the mass ratio of template consumption per unit of AEI product. In zeolite formulation convention, however, the molar ratio of template vs $SiO_2$ is usually used to indicate the template requirement. This less closely reflects the template consumption. In U.S. Pat. No. 5,958,370, the amount of template ranged from 14-18 moles of template per 100 moles of $SiO_2$. In Moliner, the amount of template was 17 moles of template per 100 moles of $SiO_2$. The preferred amount of SDA per 100 moles of $SiO_2$ in the methods described herein is from 1.2 to 12. The Examples of the methods described herein had ratios from 1.2 to 7.9 moles of template per 100 moles of $SiO_2$.

What is claimed is:

1. A method of preparing a zeolite having an AEI framework, the method comprising:
   a. forming a reaction mixture comprising one or more sources of silica, one or more sources of alumina, a base and one or more organic structure directing agents (SDA), where at least a portion of the alumina source is an FAU topological type zeolite and wherein the reaction mixture comprises less than 600 moles of water per mole of alumina, and wherein the silica source and the alumina source are expressed as $SiO_2$ and $Al_2O_3$, respectively, and the components are present in the following ratios, where the endpoints are included:

| | |
|---|---|
| $SiO_2/Al_2O_3$ | 25-75 |
| $OH^-/SiO_2$ | 0.35-0.75 |
| $SDA/SiO_2$ | 0.01-0.12 |
| Alkali metal cation/$SiO_2$ | 0.30-0.60 |
| $H_2O/SiO_2$ | 6-30 | and
   b. reacting the reaction mixture at an elevated temperature for a period of time sufficient to form zeolite crystals having an AEI framework and a silica-to-alumina ratio (SAR) of about 10 to about 30, wherein the reacting step, prior to removal of SDAs from the zeolite crystals, has a relative yield based on the weight of the AEI to the weight of the reaction mixture of ≥about 5%.

2. The method of claim 1, wherein the structure directing agents comprises one or more cations selected from the group consisting of N,N-dimethyl-3,5-dimethylpiperidinium, N,N-dimethyl-2-(2-hydroxyethyl)piperidinium, N,N-dimethyl-2-ethylpiperidinium, and 2,2,4,6,6-pentamethyl-2-azoniabycyclo[3.2.1]octane.

3. The method of claim 1, wherein the silica source is selected from the group consisting of a solid silica, water-glass (sodium silicate), dealuminated Y, NaY and USY.

4. The method of claim 1, wherein the relative yield is ≥about 8%.

5. The method of claim 1 where the yield of AEI zeolite based on the structure directing agent is ≥about 30%.

6. The method of claim 1 where the yield of AEI zeolite based on the structure directing agent is ≥about 65%.

7. The method of claim 1 wherein the reaction mixture is substantially free of fluorine, fluorine ions, and fluorine containing compounds.

8. The method of claim 1 wherein the SAR of the AEI zeolite crystals is about 10 to about 20.

9. A composition comprising the following components: one or more sources of silica, one or more sources of alumina, one or more structure directing agents (SDA), a source of hydroxide ions and water, where the silica source and the alumina source are expressed as $SiO_2$ and $Al_2O_3$, respectively, and the components are present in the following ratios, where the endpoints are included:

| | |
|---|---|
| $SiO_2/Al_2O_3$ | 25-75 |
| $OH^-/SiO_2$ | 0.35-0.75 |
| $SDA/SiO_2$ | 0.01-0.12 |
| Alkali metal cation/$SiO_2$ | 0.30-0.60 |
| $H_2O/SiO_2$ | 6-30 | wherein the composition, upon reacting at a temperature of between about 75 to about 220° C. for between 0.1 and 20 days, produces AEI zeolite crystals having a silica-to-alumina ratio (SAR) of about 10 to about 30.

* * * * *